Patented May 25, 1954

2,679,546

UNITED STATES PATENT OFFICE 2,679,546

BATTERY COMPONENT

John B. Eisen, Waterloo, Wis., assignor to Bjorksten Research Laboratories, Inc., a corporation of Illinois No Drawing. Application January 25, 1952, Serial No. 268,343

7 Claims. (Cl. 136—20)

This invention relates to electrical batteries, and more particularly to alkali-type batteries, in which the cathode plate consists of a conductive backing plate to which a metal oxide is firmly bonded.

Heretofore, such plates have been gravely limited in their applicability by the requirement that the said oxide be firmly bonded to the said metal plate. It has been necessary to provide the metal plate with holes or grids, in order to make possible adequate adhesion of the metal oxide component, and this component has been applied by methods such as pasting and the like, which have been quite tedious and difficult, and above all, have not been adapted for the preparation of extremely thin plates. Furthermore, plates so prepared have been brittle, and on severe mechanical abrasion or vibration, the metal oxides have tended to flake off. Furthermore, in order to make them adhere at least to some degree, extremely high pressures have been used in stamping or preparing such plates, and this is a manufacturing inconvenience.

It has been attempted to adhere the oxides by means of various binders, but on the one hand such binders have been soluble in the strongly alkaline electrolytes used in the system, and on the other hand they have been reactive with the metal oxides used in the batteries to cause reduction, with consequent loss in efficacy of the batteries. This has been particularly true with relation to the easily reduced oxides of noble metals or semi-noble metals, such as, for example, cupric oxide, mercuric oxide, silver oxide, silver peroxide, arsenium oxide, gold oxide, and the like.

I have discovered a binder which has been found suitable for these applications and which makes possible the preparation of such adherent pastes of these metal oxides that the said metal oxides can be applied by printing processes. This leads to a drastic reduction in the time and costs required for preparing such cathode plates, and particularly to a reduction in weight of such plates.

The invention is further illustrated by the following specific examples:

Example 1

A film of silver peroxide powder, initially water-coated onto a grid of silver gauze, was finally anchored by dipping it into a slurry of 10 parts 40% sodium silicate, 6 parts finely powdered fluorite, and 2 parts of aluminum hydroxide gel. After air-drying, the composite film was baked 30 minutes at 95° C.

Example 2

A film of silver peroxide on a silver grid was fixed by dipping in a dispersion of 4 parts powdered cryolite in 12 parts by weight of a 40% sodium silicate solution. Upon air-drying, baking 30 minutes at 90° C., the composite film was permeable to, but not soluble in 30% aq. KOH.

Example 3

Silver peroxide powder was mixed with the silicate dispersions of 1 or 2 above, in weight proportions of 30–70% silver peroxide, and coated onto the electrically conducting base, air-dried, and baked at 95° C. The silver peroxide was electrochemically reduced to silver in a cell against zinc, using 31% KOH aq.

Example 4

A thin paste of 50 wts. mercuric oxide (yellow) was made with 25 wts. of 40% sodium silicate and 25 wts. of 25% sodium fluoborate aq. solution, and coated onto a stainless steel grid. Upon air-drying and baking at 100° C., the structure served as cathode against zinc in 31% KOH solution.

While reference has been made to certain specific metal oxides, it is understood that the invention is broadly applicable to binding metal oxides to conductive plates and that it is not restricted to any one particular oxide, or to any particular metallic plate, inasmuch as many metals appear suitable for the purposes of this invention. The preferred embodiment is the one shown in Example 3.

In addition to the metals shown in the examples, I may also employ the following metal oxides and hydroxides: $Ca(OH)_2$, ZnO, MgO, $TiO_2$, $Ba(OH)_2$, PbO.

While certain specific compositions of fluorides and silicates have been shown, it is understood that, broadly speaking, combinations of all water-soluble silicates are applicable, in conjunction with fluorides of all metals which form water-soluble fluorides but water-insoluble silicates.

The invention is operable within the mole-percentage range of 20–80% of the silicates to 80–20% of the fluorides, and the preferred range is between 40 and 60% for the silicate and 60 and 40% for the fluoride.

It is thus seen that the invention is broad in scope and is not to be restricted excepting by the claims, in which it is my intention to claim all novelty inherent in the invention as broadly as possible, in view of prior art. Having thus disclosed my invention, I claim:

1. A battery plate comprising a metal oxide bonded to a conductive plate by means of an irreversably dehydratable fluorosilicic cement.

2. A battery plate comprising mercuric oxide bonded to an electrically conductive plate, by means of an irreversably dehydratable fluorosilicic cement.

3. A battery plate comprising a metal oxide bonded to an electrically conductive plate, by means of a cement comprising approximately equal proportions of calcium fluoride and sodium silicate.

4. An electrical battery comprising, as a cathode plate thereof, a metal oxide bonded to a conductive plate, by means of a cement comprising between 20 and 80% of an alkali earth fluoride, and between 80 and 20% of a silicate of a cation selected from the group consisting of alkali metals, the said plate being immersed in an alkaline electrolyte.

5. A battery plate comprising silver oxide bonded to an electrically conductive plate, by means of an irreversably dehydratable fluorosilicic cement.

6. A battery plate comprising silver peroxide bonded to an electrically conductive plate, by means of an irreversably dehydratable fluorosilicic cement.

7. An electrical battery, comprising, as a cathode plate thereof, a metal oxide bonded to a conductive plate, by means of a cement comprising between 40 and 60% of an alkali earth fluoride, and between 60 and 40% of a silicate of a cation selected from the group consisting of alkali metals, the said plate being immersed in an alkaline electrolyte.

References Cited in the file of this patent

UNITED STATES PATENTS

| Number | Name | Date |
|---|---|---|
| 496,517 | Hensel | May 2, 1893 |
| 578,887 | Linde | Mar. 16, 1897 |
| 1,023,861 | Marino | Apr. 23, 1912 |
| 2,108,748 | Harner et al. | Feb. 15, 1938 |
| 2,561,943 | Moulton et al. | July 24, 1951 |
| 2,601,133 | Yardeny | June 17, 1952 |

FOREIGN PATENTS

| Number | Country | Date |
|---|---|---|
| 16,938 of 1891 | Great Britain | Oct. 1, 1892 |